(12) United States Patent
Wu et al.

(10) Patent No.: US 9,767,024 B2
(45) Date of Patent: Sep. 19, 2017

(54) CACHE CLOSURE AND PERSISTENT SNAPSHOT IN DYNAMIC CODE GENERATING SYSTEM SOFTWARE

(71) Applicant: Intel Corporation, Santa Clara, CA (US)

(72) Inventors: Yong Wu, Shanghai (CN); Xiao Dong Lin, Shanghai (CN); Jiajia Yu, Shanghai (CN); Xueliang Zhong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/780,428

(22) PCT Filed: Dec. 18, 2014

(86) PCT No.: PCT/CN2014/094199
§ 371 (c)(1),
(2) Date: Sep. 25, 2015

(87) PCT Pub. No.: WO2016/095156
PCT Pub. Date: Jun. 23, 2016

(65) Prior Publication Data
US 2016/0321178 A1 Nov. 3, 2016

(51) Int. Cl.
*G06F 9/45* (2006.01)
*G06F 12/08* (2016.01)
*G06F 12/0808* (2016.01)
*G06F 12/0815* (2016.01)
*G06F 9/455* (2006.01)
*G06F 12/0868* (2016.01)

(52) U.S. Cl.
CPC ........ *G06F 12/0815* (2013.01); *G06F 9/4552* (2013.01); *G06F 12/0808* (2013.01); *G06F 12/0868* (2013.01)

(58) Field of Classification Search
CPC ...... G06F 9/4552; G06F 9/45; G06F 12/0868; G06F 12/0808; G06F 12/0815
USPC ......................................... 711/141, 143, 145
See application file for complete search history.

(56) References Cited

U.S. PATENT DOCUMENTS

| | | | |
|---|---|---|---|
| 6,782,410 B1 * | 8/2004 | Bhagat | G06F 9/5027 709/201 |
| 6,842,377 B2 * | 1/2005 | Takano | G11C 7/1021 365/185.21 |
| 7,017,011 B2 * | 3/2006 | Lesmanne | G06F 12/082 711/141 |

(Continued)

FOREIGN PATENT DOCUMENTS

WO 2013119211 A1 8/2013

OTHER PUBLICATIONS

International Search Report and Written Opinion for PCT Application No. PCT/CN2014/094199, dated Sep. 22, 2015, 11 pages.

*Primary Examiner* — Daniel C Chappell
*Assistant Examiner* — Mohamed Gebril
(74) *Attorney, Agent, or Firm* — Jordan IP Law, LLC

(57) ABSTRACT

Systems and methods may provide translation cache closure and consistent data recovery in dynamic code generating system. An apparatus may group translation cache together and restore a translation cache snapshot as a whole. Chaining between translations may be maintained during saving and restoration.

21 Claims, 6 Drawing Sheets

(56) References Cited

U.S. PATENT DOCUMENTS

| | | | | |
|---|---|---|---|---|
| 7,196,942 B2* | 3/2007 | Khurana | G11C 7/1051 | 326/38 |
| 7,269,715 B2* | 9/2007 | Le | G06F 9/3802 | 712/215 |
| 7,321,955 B2* | 1/2008 | Ohmura | G06F 12/0804 | 711/113 |
| 7,512,736 B1* | 3/2009 | Overby | G06F 3/0607 | 707/999.202 |
| 7,945,761 B2 | 5/2011 | Subrahmanyam et al. | | |
| 8,230,193 B2* | 7/2012 | Klemm | G06F 3/0608 | 711/114 |
| 8,566,546 B1* | 10/2013 | Marshak | G06F 3/0604 | 711/112 |
| 8,990,527 B1* | 3/2015 | Linstead | G06F 3/0617 | 711/161 |
| 2004/0068621 A1* | 4/2004 | Van Doren | G06F 12/0828 | 711/144 |
| 2005/0125607 A1* | 6/2005 | Chefalas | G06F 12/0862 | 711/113 |
| 2007/0008328 A1* | 1/2007 | MacWilliams | G06F 12/0646 | 345/530 |
| 2009/0094413 A1* | 4/2009 | Lehr | G06F 3/0605 | 711/112 |
| 2009/0228648 A1* | 9/2009 | Wack | G06F 11/1092 | 711/114 |
| 2009/0282101 A1* | 11/2009 | Lim | G06F 9/5077 | 709/203 |
| 2010/0046267 A1* | 2/2010 | Yan | G11C 16/24 | 365/51 |
| 2010/0050016 A1* | 2/2010 | Franklin | G06F 11/0727 | 714/6.32 |
| 2010/0125712 A1* | 5/2010 | Murase | G06F 11/1458 | 711/162 |
| 2010/0332780 A1* | 12/2010 | Furuya | G06F 3/0689 | 711/162 |
| 2011/0202735 A1* | 8/2011 | Kono | G06F 11/1451 | 711/162 |
| 2011/0307745 A1* | 12/2011 | McCune | G06F 17/30221 | 714/54 |
| 2012/0054152 A1 | 3/2012 | Adkins et al. | | |
| 2012/0198107 A1* | 8/2012 | McKean | G06F 13/18 | 710/40 |
| 2013/0007373 A1* | 1/2013 | Beckmann | G06F 12/126 | 711/136 |
| 2013/0067161 A1* | 3/2013 | Chandra | G06F 13/12 | 711/114 |
| 2013/0080805 A1* | 3/2013 | Vick | G06F 8/4432 | 713/320 |
| 2013/0111129 A1* | 5/2013 | Maki | G06F 3/0611 | 711/117 |
| 2013/0132695 A1 | 5/2013 | Heo et al. | | |
| 2013/0152097 A1* | 6/2013 | Boctor | G06F 9/505 | 718/103 |
| 2013/0263124 A1 | 10/2013 | Patel et al. | | |
| 2013/0326270 A1* | 12/2013 | Chen | G06F 11/2089 | 714/6.21 |
| 2014/0003114 A1* | 1/2014 | Pellizzer | H01L 27/2481 | 365/63 |
| 2014/0094315 A1 | 4/2014 | Stine et al. | | |

* cited by examiner

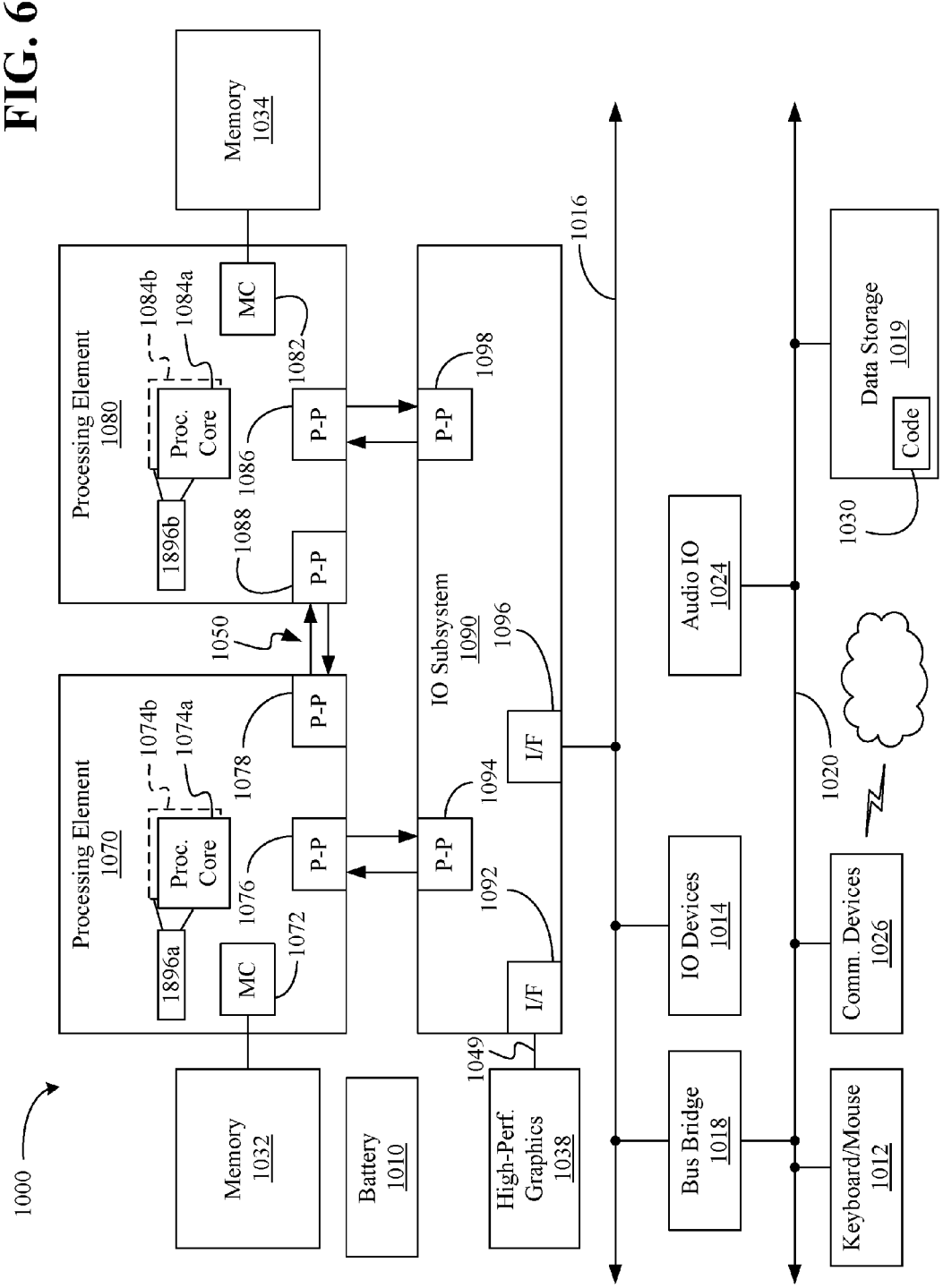

US 9,767,024 B2

CACHE CLOSURE AND PERSISTENT SNAPSHOT IN DYNAMIC CODE GENERATING SYSTEM SOFTWARE

TECHNICAL FIELD

Embodiments generally relate to software translation. More particularly, embodiments relate to the grouping of translation cache code and/or data together using a snapshot based translation cache persistency.

BACKGROUND

A process virtual machine (PVM) may allow an application compiled for source instruction source architecture (ISA) to run on a target ISA. The target ISA may be translated from the source ISA dynamically during the application runtime. In addition to translated target instructions, the PVM may build corresponding data structures to describe a translated code region, wherein the translated target instructions and the corresponding data structures may form a translation cache (TC). The process of translation may generate the TC for later execution by breaking the source code to multiple code regions and translating the regions one by one. Translation cache persistency (TCP) may involve serializing the TC when an application starts up later. TCP may save/store the TC at the granularity of per-translation region and for each translation region, the generated TC may include translated target code (TTC) and translation description information that describes a translated region (TDI). Because TC is position dependent, a restoration of the saved TC to memory may require maintaining: the referral of memory address to each other using pointers, including all possible combinations such as TDI<->TTC or TTC<->TTC (chaining) where (-> indicates reference); TTC referring code/data in PVM; and TTC and TDI depending on the source program counter (PC). To avoid data inconsistency, TTC chaining may be unchained to remove the TTC<-> reference and may have a diminutive effect on performance.

BRIEF DESCRIPTION OF THE DRAWINGS

The various advantages of the embodiments will become apparent to one skilled in the art by reading the following specification and appended claims, and by referencing the following drawings, in which:

FIG. 6 is a block diagram of an example of a computing system according to an embodiment.

DESCRIPTION OF EMBODIMENTS

Figure 1:
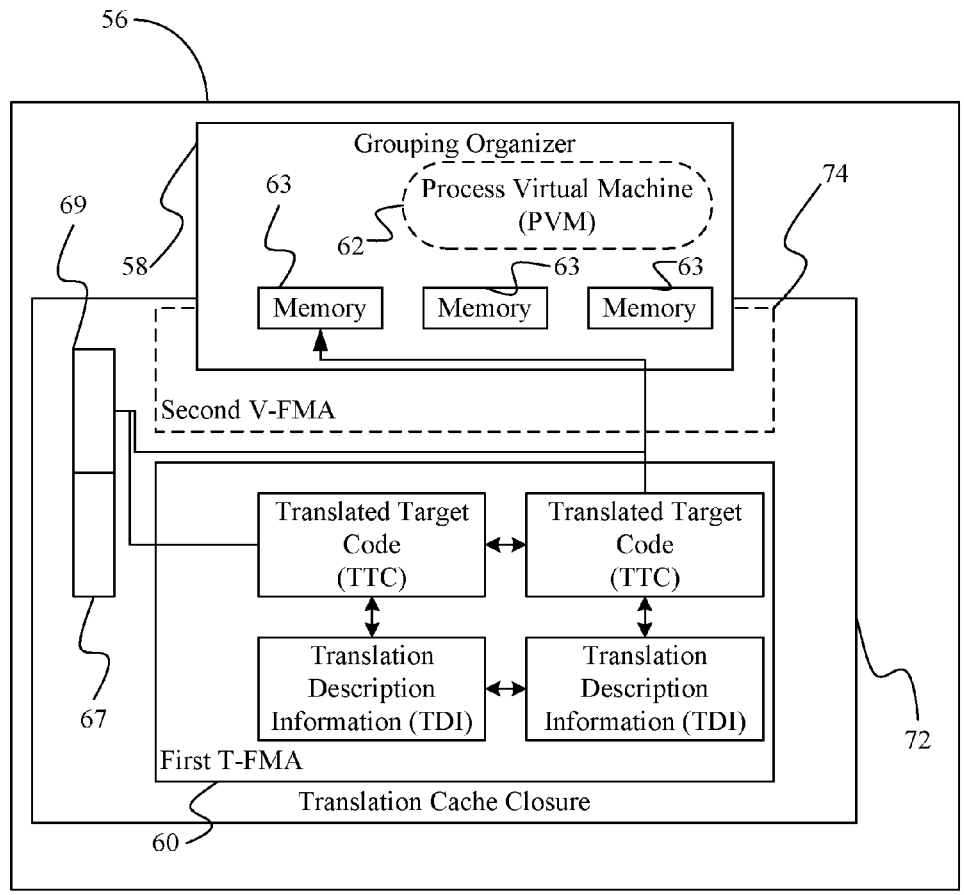
FIG. 1 is a block diagram of an example of an apparatus according to an embodiment.

In FIG. 1, an apparatus 56 to process a TC in a recovery translation process, according to an embodiment is described. The apparatus 56 may include a grouping organizer 58 to group translation cache data together to form a translation cache closure 60. The grouping organizer 58 may allocate the translation cache from a first fixed-mapped continuous memory area 72 and may allocate reusable translation cache data from a memory pool 63 that facilitates persistent translation cache storage and recovery. The grouping organizer 58 may group non-translation cache data into a second fixed-mapped continuous memory area 74 and include information from both compilation time and application initialization. The grouping organizer 58 may group together both the first and second fixed-mapped continuous memory areas 72, 74 to form the translation cache closure 60. A persistency buffer 67 may save the translation cache closure 60 to persistent memory in a snapshot consistent state (see FIG. 2) and may form a saved persistent translation cache (see FIG. 2). The persistency buffer 67 may filter out of the persistent translation cache data not stored in the translation cache closure 60, and may flag the filtered out translation cache as persistent invalid (see FIG. 2) which may be invalidated during recovery of the translation cache data. The persistency buffer 67 may save as a whole and overwrite old snapshot consistent states as new consistent states are generated, allocate and save translation cache data from multiple first fixed-mapped continuous memory areas 72, save active translation of the first fixed-mapped continuous memory areas 72 with a serial number allocated for each translation (see FIG. 2), and load saved translations to corresponding positions when recovered. A recouper 69 may recover the translation cache data after reloading the persistent translation cache to a memory area 63. The recouper 69 may recover the persistent translation cache upon reloading into the first fixed-mapped continuous memory area 72. The recouper 69 may perform a validation for originality and initiate a translation cache data invalidation process to clear invalid translation cache data (see FIG. 2). The recouper 69 may decompress and decrypt one or more of compressed and encrypted persistent caches and reposition at least one or more of compressed and encrypted persistent translation caches to pre-defined addresses during recovery (see FIG. 2).

Figure 2:
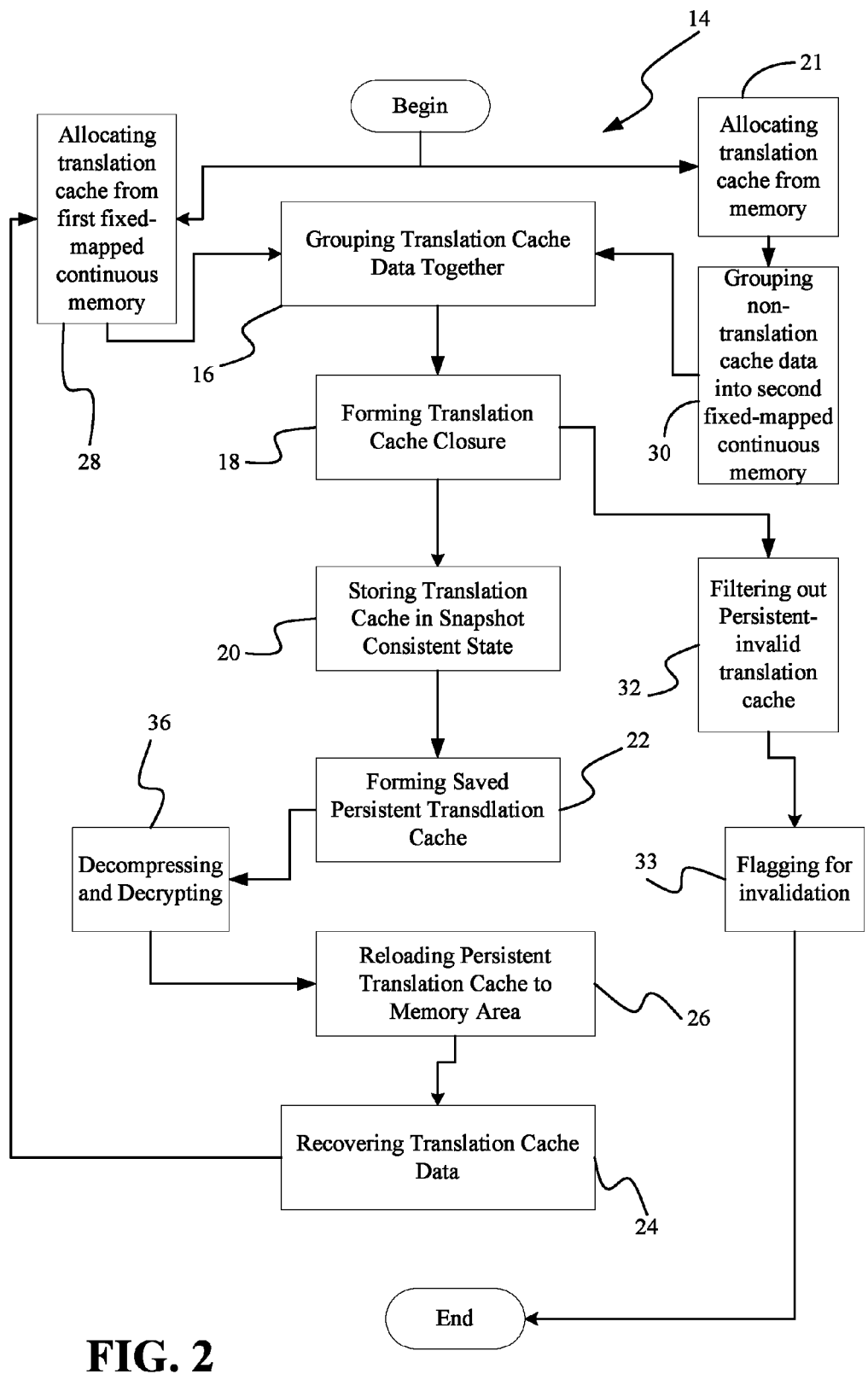
FIG. 2 is a flowchart of an example of a method to process translation cache data according to an embodiment.

FIG. 2 illustrates an example of a method 14 to recover translation cache data according to an embodiment. In this example, translation cache data from memory at block 21 may be grouped together. A first fixed-mapped continuous memory area (TFMA) at block 28 may be formed with this grouping. TFMA may allocate reusable TC data (i.e. data that may be reused across-run) from a memory pool that may be designed specially to facilitate translation cache persistency recovery and storage. All non-TC data may be grouped into a second fixed-mapped continuous memory area (VFMA) at block 30. This area may include data from both compilation time and PVM initialization. In the compilation time, all TC-visible data (not shown) may be relocated to sections in VFMA during PVM initialization. The TFMA at block 28 and VFMA at block 30 may be combined to form a translation cache closure (TCC) at block 18 where no external address reference may be allowed, but, outside world reference on the data may be possible. A translation cache snapshot at block 20 may be saved in a consistent state from the translation cache closure at block 18. The TC snapshot at block 20 may include all the allocated blocks (a block can be a memory page) in TC memory pool. The generated TC snapshot at block 20 may be saved to a persistency translation memory cache (PTC) at block 22. In the consistent state, the TC can be in read or execution mode, and any write operations to the TC may be blocked. As stated above earlier, TC filtered out at block 32 may be flagged as persistent invalid at block 33 and may be invalidated during TC snapshot recovery. Recovery of TC may be enabled by reloading the persistent translation memory cache (PTC) at block 26 back into TFMA at block 24. A validation process may be initiated to check whether the PTC is original or must be discarded. Any needed decompression and decryption may be performed at block 36. If there is multiple PTC, it may be recovered to multiple TFMA. If the PTC at block 22 is saved in block granularity, it may need to be re-positioned to pre-defined addresses. After the TC recovery, the active contents in TFMA may be the same as that saved in persistency, including whether loaded to the same memory address.

Figure 3:
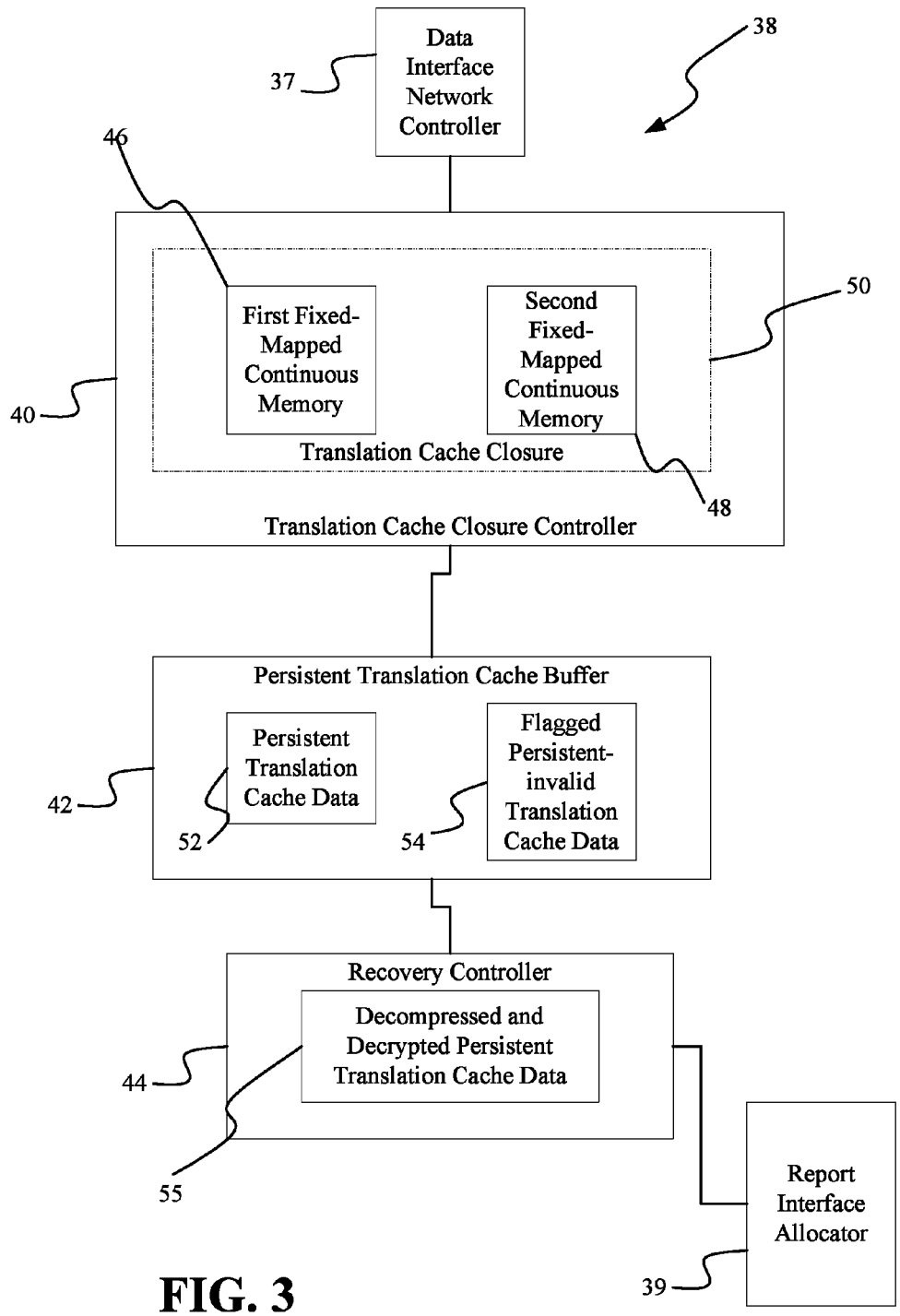
FIG. 3 is a block diagram of an example of a computing system according to an embodiment.

FIG. 3 describes a computing system 38 that may implement the method 14 described in FIG. 2. In FIG. 3 the computing system 38 may include a data interface network controller 37 to obtain translation cache data. The computing system 38 may also include a translation cache closure controller 40 that enables and forms the translation cache closure 50. The translation cache closure 50 may include first and second fixed-mapped continuous memory 46, 48 from grouping all TC. A persistent translation cache buffer 42 may store a snapshot of consistent cache data as persistent translation cache data 52. Inconsistent, persistent-invalid data may be flagged and stored as flagged persistent-invalid translation cache data 54. Recovery of the TC may be enabled by using a recovery controller 44 to reload persistency memory back into the TFMA. The recovery controller 44 may decompress and decrypt persistent translation cache data, where needed. A validation of the persistency memory may also be performed during the recovery of the TC. A report interface allocator 39 may output one or more results associated with recovery of the translation cache data.

Figure 4:
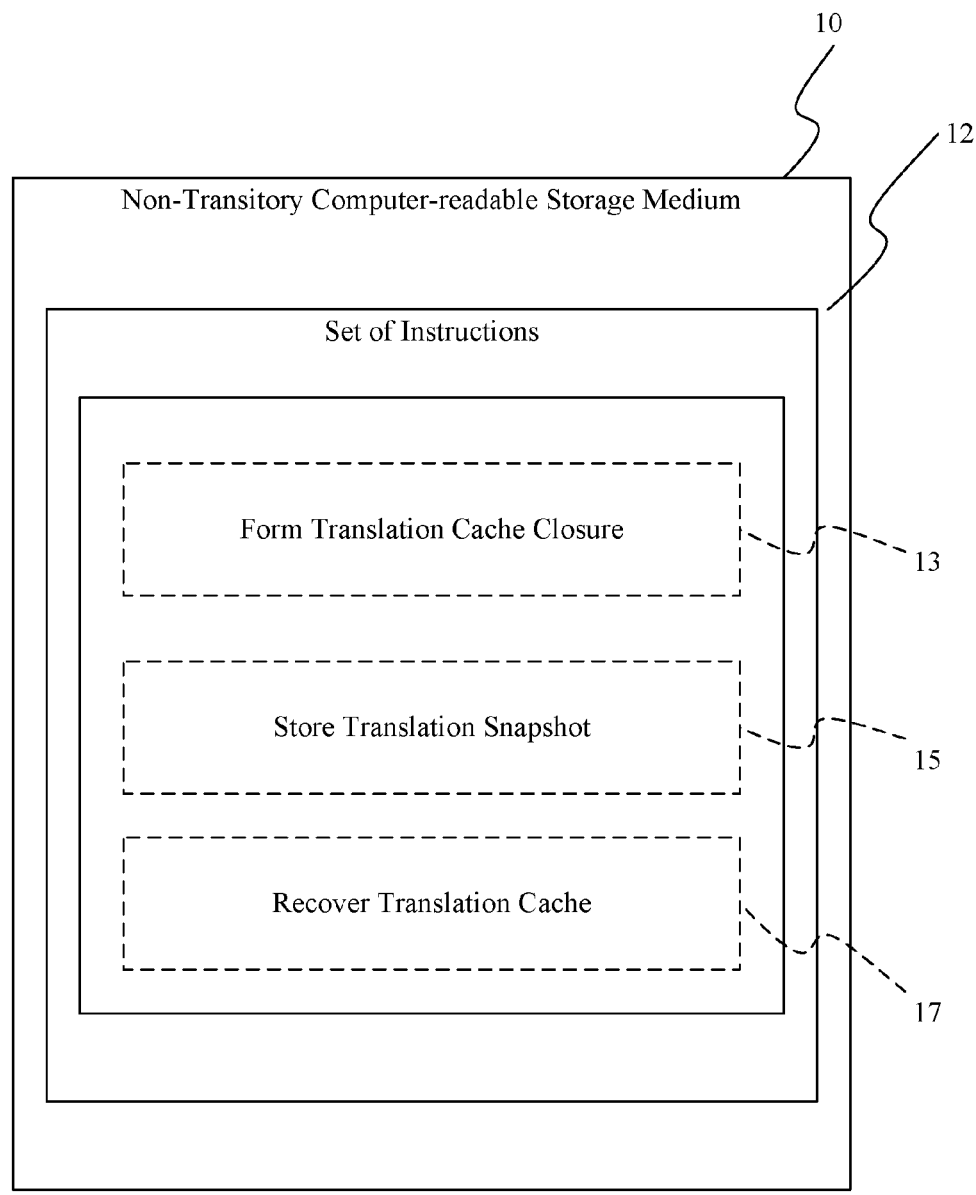
FIG. 4 is a block diagram of an example of an apparatus to process translation cache data according to an embodiment.

In FIG. 4, a non-transitory computer readable storage medium 10 with a set of instructions 12 to enable a computing system to restore translated TC data is described. In this example, the set of instructions 12 may enable the computing system to form a translation cache closure at block 13 by grouping initial TC data. The TC may be grouped together and allocated from a first fixed-mapped continuous memory area (TFMA, see FIG. 2) that allocates reusable TC data from a memory pool specifically designed to facilitate recovery of translation cache persistency (TCP, see FIG. 2). All non-TC data accessed from the TC may be grouped into a second fixed-mapped continuous memory area (see FIG. 2) and relocated during PVM initialization. The first and second fixed-mapped continuous memory areas may be enabled by the set of instructions 12 to form a translation cache closure (TCC) at block 13 where no external address reference may be allowed from the closure, but outside reference to the data within the TCC may be possible.

With TCC it may be possible to store a TC snapshot at block 15 in a consistent state when a translation is finished and a new translation has not yet been started. A TC snapshot (see FIG. 2) may include all allocated blocks (for example, a block of memory page) in a TC memory pool. The generated snapshot may be saved to persistent memory (see FIG. 2) such as flash memory, disk or network server. In the consistent state, the TC may be in read or execution mode, and any write operations to TC may be blocked. TC snapshot build may occur by any consistent state which means that the PVM may save the snapshot multiple times. TC generated only for temporary use (i.e. TC for self-modified-code, or dynamically generated source code) may not be applicable for reuse and may be filtered out and invalidated during recovery. During the storing of the snapshot no user data, like user name, password etc. may be saved because only translated code and description information may be included. An implementation may allocate all TC from one first fixed-mapped continuous memory area and save them as a whole, allocate TC from multiple first fixed-mapped continuous memory areas and store them accumulatively, and store only active translations in first fixed-mapped continuous memory areas, with a serial number allocated to each. Saved persistent translation cache (see FIG. 3) may be encrypted and compressed to prevent tampering and save storage space.

The set of instructions 12 may enable recovery of TC 17 by reloading the persistent translation cache (see FIG. 2) into first fixed-mapped continuous memory (see FIG. 3). A validation may be performed (see FIG. 2) to check whether the persistent translation cache is original and may be abandoned if validation fails. The PVM may perform an invalidation process (see FIG. 2) on the recovered TC to filter out any invalid TC. The filtered out translation cache data may be flagged as persistent-invalid and invalidated during recovery of the translation cache data. Persistent translation cache may be re-positioned if needed to pre-defined addresses and thus, after recovery, all active components in the first fixed-mapped continuous memory areas may be the same as saved to persistency, including whether loaded to the same memory address. Hence, chaining of translated target code (TTC) and translation description information (TDI) may be maintained.

Figure 5:
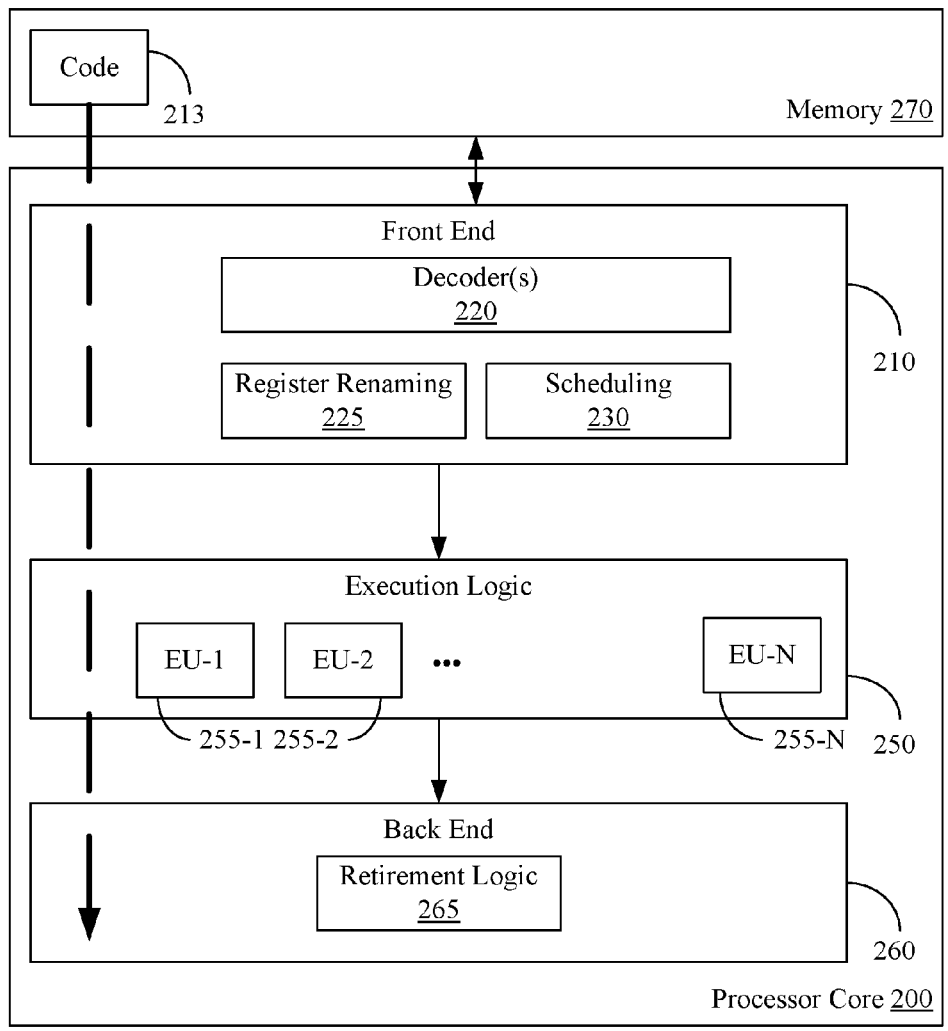
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, a process virtual machine, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 14 (FIG. 2), already discussed. In one example, the memory 270 is non-flash memory. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function.

The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 6, shown is a block diagram of a computing system 1000 example in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 20 (FIG. 2), already discussed, and may be similar to the code 213 (FIG. 5), already discussed. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples:

Example 1 may include a system to support virtual machine operation, comprising a data interface network controller to obtain translation cache data, a translation cache closure controller to gather translation cache data to form translation cache closure data, a persistent translation cache buffer to build and store the translation cache closure data as persistent translation cache data, a recovery controller to reload the persistent translation cache data into a first fixed-mapped continuous memory area to recover the translation cache data, and a report interface allocator to output one or more results associated with recovery of the translation cache data.

Example 2 may include the system of Example 1, wherein the translation cache controller to allocate the translation cache data from a first fixed-mapped continuous memory area.

Example 3 may include the system of Example 1, wherein the persistent translation cache buffer to allocate reusable translation cache data from a memory pool that facilitates persistent translation cache storage and recovery.

Example 4 may include the system of Example 1, wherein the translation cache closure controller to group non-translation cache data into a second fixed-mapped continuous memory area to include both compilation time and application initialization, and group together both the first and second fixed-mapped continuous memory areas to form the translation cache closure.

Example 5 may include the system of Example 1, wherein the persistent translation cache buffer to save the snapshot consistent state to persistent wherein the snapshot consistent state includes stored allocated memory blocks in the memory, filter translation cache data not stored in the translation cache closure out of the persistent translation cache, and flag the filtered out translation cache data as persistent-invalid that is invalidated during recovery of the translation cache data.

Example 6 may include the system of Example 1, wherein the recovery controller to allocate translation cache data from one first fixed-mapped continuous memory, save as a whole and overwrite old snapshot consistent states as new states are generated, allocate and save translation cache data from multiple first fixed-mapped continuous memory areas, save active translations of the first fixed-mapped continuous memory areas with a serial number allocated for each translation, and load saved translations to corresponding positions when recovered.

Example 7 may include the system of any one of Examples 1 to 6, wherein the recovery controller to recover the persistent translation cache upon reloading into the first fixed-mapped continuous memory area, perform validation for originality, decompress and decrypt one or more of compressed and encrypted persistent caches, re-position at least one or more of compressed and encrypted persistent translation caches to pre-defined addresses, and initiate a translation cache data invalidation process to clear invalid translation cache data.

Example 8 may include a method to process translation cache data, comprising grouping translation cache data together to form a translation cache closure, storing the translation cache closure in a snapshot consistent state to form a saved persistent translation cache, and recovering the translation cache data after reloading the persistent translation cache to a memory area.

Example 9 may include the method of Example 8, further including allocating the translation cache data from a first fixed-mapped continuous memory area, and allocating reusable translation cache data from a memory pool that facilitates persistent translation cache storage and recovery.

Example 10 may include the method of Example 8, further including grouping non-translation cache data into a second fixed-mapped continuous memory area to include information from both compilation time and application initialization, and grouping together both first and second fixed-mapped continuous memory areas to form the translation cache closure.

Example 11 may include the method of Example 8, further including saving the snapshot consistent state to persistent memory, wherein the snapshot consistent state includes stored allocated memory blocks in the memory, filtering translation cache data not stored in the translation cache closure out of the persistent translation cache, and flagging the filtered out translation cache data as persistent-invalid and invalidated during recovery of the translation cache data.

Example 12 may include the method of Example 8, further including allocating translation cache data from one first fixed-mapped continuous memory, saving as a whole and overwriting old snapshot consistent states as new states are generated, allocating and saving translation cache data from multiple first fixed-mapped continuous memory areas, saving active translations of the first fixed-mapped continuous memory areas with a serial number allocated for each translation, compressing and encrypting one or more of translations; and loading saved translations to corresponding positions when recovered.

Example 13 may include the method of any one of Examples 8 to 12, wherein the persistent translation cache is recovered upon reloading into the first fixed-mapped continuous memory area, the method further including, performing validation for originality, decompressing and decrypting one or more of compressed and encrypted persistent translation caches, re-positioning at least one or more of compressed and encrypted persistent translation caches to pre-defined addresses, and initiating a translation cache data invalidation process to clear invalid translation cache data.

Example 14 may include at least one non-transitory computer readable storage medium comprising a set of instructions which, when executed by a computing system, cause the computing system to group translation cache data together to form a translation cache closure, store the translation cache closure in a snapshot consistent state to form a saved persistent translation cache, and recover the translation cache data after reloading the persistent translation cache to a memory area.

Example 15 may include the at least one non-transitory computer readable storage medium of Example 14, wherein the instructions, when executed, cause the computing system to allocate the translation cache data from a first fixed-mapped continuous memory area, and allocate reusable translation cache data from a memory pool that facilitates persistent translation cache storage and recovery.

Example 16 may include the at least one non-transitory computer readable storage medium of Example 15, wherein the instructions, when executed, cause the computing system to group non-translation cache data into a second fixed-mapped continuous memory area to include information from both compilation time and application initialization, and group together both first and second fixed-mapped continuous memory areas to form the translation cache closure.

Example 17 may include the at least one non-transitory computer readable storage medium of Example 14, wherein the instructions, when executed, cause the computing system to save the snapshot consistent state to persistent memory, wherein the snapshot consistent state includes all stored allocated memory blocks in the memory, filter translation cache data not stored in the translation cache closure out of the persistent translation cache, and flag the filtered out translation cache data as persistent-invalid and invalidate during recovery of the translation cache data.

Example 18 may include the at least one non-transitory computer readable storage medium of Example 14, wherein the instructions, when executed, cause the computing system to allocate translation cache data from one first fixed-mapped continuous memory, save as a whole and overwrite old snapshot consistent states as new states are generated, allocate and save translation cache data from multiple first fixed-mapped continuous memory areas, save active translations of the first fixed-mapped continuous memory areas with a serial number allocated for each translation, and load saved translations to corresponding positions when recovered.

Example 19 may include the at least one non-transitory computer readable storage medium of Example 15, wherein the instructions, when executed, cause the computing system to perform validation for originality, decompress and decrypt one or more of compressed and encrypted persistent translation caches, re-position at least one or more of compressed and encrypted persistent translation caches to pre-defined addresses, and initiate a translation cache data invalidation process to clear invalid translation cache data.

Example 20 may include an apparatus to process translation cache data, comprising a grouping organizer to group translation cache data together to form a translation cache closure, a persistency buffer to store the translation cache closure in a snapshot consistent state to form a saved persistent translation cache data, and a recouper to recover the translation cache data after reloading the persistent translation cache to a memory area.

Example 21 may include the apparatus of Example 20, wherein the grouping organizer to allocate the translation cache data from a first fixed-mapped continuous memory area, and allocate reusable translation cache data from a memory pool that facilitates persistent translation cache storage and recovery Example 22 may include the apparatus of Example 20, wherein the grouping organizer to group non-translation cache data into a second fixed-mapped continuous memory area to include information from both compilation time and application initialization, and group together both first and second fixed-mapped continuous memory areas to form the translation cache closure.

Example 23 may include the apparatus of Example 20, wherein the persistency buffer to save the snapshot consistent state to persistent memory, wherein the snapshot consistent state includes stored allocated memory blocks in the memory, filter translation cache data not stored in the translation cache closure out of the persistent translation cache, and flag the filtered out translation cache as persistent-invalid which is invalidated during recovery of the translation cache data.

Example 24 may include the apparatus of Example 20, wherein the persistency buffer to allocate translation cache data from one first fixed-mapped continuous memory, save as a whole and overwrite old snapshot consistent states as new states are generated, allocate and save translation cache data from multiple first fixed-mapped continuous memory areas, save active translations of the first fixed-mapped continuous memory areas with a serial number allocated for each translation, and load saved translations to corresponding positions when recovered.

Example 25 may include the apparatus of Example 20, wherein the recouper to recover the persistent translation cache upon reloading into the first fixed-mapped continuous memory area, perform validation for originality, decompress and decrypt one or more of compressed and encrypted persistent caches, re-position at least one or more of compressed and encrypted persistent translation caches to pre-defined addresses, and initiate a translation cache data invalidation process to clear invalid translation cache data.

Embodiments are applicable for use with all types of semiconductor integrated circuit (IC) chips. Examples of these IC chips include but are not limited to processors, controllers, chipset components, programmable logic arrays, memory chips, network chips, systems on chips (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g. photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term 'coupled' may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and the following claims.

We claim:

1. A system to support virtual machine operation, comprising:
   a data interface network controller to obtain cache data;
   a translation cache closure controller to group translation cache data from the cache data together to form a translation cache closure;
   a persistent translation cache buffer to store the translation cache closure in a snapshot consistent state that is to be saved to persistent memory as a persistent translation cache, wherein the snapshot consistent state includes all stored allocated memory blocks in a memory pool, and wherein the cache data not in the translation cache closure is to be filtered out of persistent translation cache, flagged as persistent-invalid, and invalidated during recovery of the translation cache data;
   a recovery controller to reload the persistent translation cache into a first fixed-mapped continuous memory area to recover the translation cache data; and
   a report interface allocator to output one or more results associated with recovery of the translation cache data.

2. The system of claim 1, wherein the translation cache closure controller is to allocate the translation cache data from a same or different fixed-mapped continuous memory area as the first fixed-mapped continuous memory area.

3. The system of claim 1, wherein the persistent translation cache buffer is to allocate the translation cache data from the memory pool, wherein the memory pool facilitates persistent translation cache storage and recovery.

4. The system of claim 1, wherein the translation cache closure controller is to:
   group non-translation cache data into a second fixed-mapped continuous memory area; and
   group together both the first and second fixed-mapped continuous memory areas to form the translation cache closure from the translation cache data and the non-translation cache data.

5. The system of claim 1, wherein the recovery controller is to one or more of:
   allocate all translation cache data from the first fixed-mapped continuous memory save all translation cache data as a whole and overwrite an old snapshot consistent state as a new snapshot state is generated; or
   allocate all translation cache data from multiple first fixed-mapped continuous memory areas save active translations of the multiple first fixed-mapped continuous memory areas with a serial number allocated for each translation and load the active translations to corresponding positions in the multiple first fixed-mapped continuous memory areas when recovered.

6. The system of claim 1, wherein the recovery controller is to:
   recover the persistent translation cache upon reloading into the first fixed-mapped continuous memory area;
   perform validation for originality;
   decompress the persistent translation cache when the persistent translation cache is compressed;
   decrypt the persistent translation cache when the persistent translation cache is encrypted;
   re-position the persistent translation cache to a pre-defined address; and
   initiate a translation cache data invalidation process to clear the persistent-invalid translation cache data.

7. A method to process translation cache data, comprising:
   grouping translation cache data together to form a translation cache closure;
   storing the translation cache closure in a snapshot consistent state a that is saved to persistent memory as a saved persistent translation cache, wherein the snapshot consistent state includes all stored allocated memory blocks in a memory pool, and wherein cache data not in the translation cache closure is to be filtered out of persistent translation cache, flagged as persistent-invalid, and invalidated during recovery of the translation cache data; and
   recovering the translation cache data after reloading the persistent translation cache to a memory area.

8. The method of claim 7, further including:
   allocating the translation cache data from a same or different fixed-mapped continuous memory area as the first fixed-mapped continuous memory area; and
   allocating the translation cache data from the memory pool, wherein the memory pool facilitates persistent translation cache storage and recovery.

9. The method of claim 7, further including:
   grouping non-translation cache data into a second fixed-mapped continuous memory area; and
   grouping together both first and second fixed-mapped continuous memory areas to form the translation cache closure from the translation cache data and the non-translation cache data.

10. The method of claim 7, further including one or more of:
    allocating all translation cache data from the first fixed-mapped continuous memory saving all translation cache data as a whole and overwriting an old snapshot consistent state as a new snapshot state is generated; or
    allocating all translation cache data from multiple first fixed-mapped continuous memory areas saving active translations of the multiple first fixed-mapped continuous memory areas with a serial number allocated for each translation and loading the active translations to corresponding positions in the multiple first fixed-mapped continuous memory areas when recovered.

11. The method of claim 7, wherein the persistent translation cache is recovered upon reloading into the first fixed-mapped continuous memory area, the method further including;
    performing validation for originality;
    decompressing the persistent translation cache when the persistent translation cache is compressed;
    decrypting the persistent translation cache when the persistent translation cache is compressed;
    re-positioning the persistent translation cache to a pre-defined address; and
    initiating a translation cache data invalidation process to clear the persistent-invalid translation cache data.

12. At least one non-transitory computer readable storage medium comprising a set of instructions which, when executed by a computing system, cause the computing system to:
    group translation cache data together to form a translation cache closure;
    store the translation cache closure in a snapshot consistent state that is to be saved to persistent memory as a saved persistent translation cache, wherein the snapshot consistent state includes all stored allocated memory blocks in a memory pool, and wherein cache data not in the translation cache closure is to be filtered out of persistent translation cache, flagged as persistent-invalid, and invalidated during recovery of the translation cache data; and recover the translation cache data after reloading the persistent translation cache to a memory area.

13. The at least one non-transitory computer readable storage medium of claim 12, wherein the instructions, when executed, cause the computing system to:
   allocate the translation cache data from a same or different fixed-mapped continuous memory area as the first fixed-mapped continuous memory area; and
   allocate the translation cache data from the memory pool, wherein the memory pool facilitates persistent translation cache storage and recovery.

14. The at least one non-transitory computer readable storage medium of claim 13, wherein the instructions, when executed, cause the computing system to:
   group non-translation cache data into a second fixed-mapped continuous memory area ; and
   group together both first and second fixed-mapped continuous memory areas to form the translation cache closure from the translation cache data and the non-translation cache data.

15. The at least one non-transitory computer readable storage medium of claim 12, wherein the instructions, when executed, cause the computing system to one or more of:
   allocate all translation cache data from the first fixed-mapped continuous memory save all translation cache data as a whole and overwrite an old snapshot consistent state as a new snapshot state are is generated; or
   allocate all translation cache data from multiple first fixed-mapped continuous memory areas save active translations of the multiple first fixed-mapped continuous memory areas with a serial number allocated for each translation and load the active translations to corresponding positions in the multiple first fixed-mapped continuous memory areas when recovered.

16. The at least one non-transitory computer readable storage medium of claim 13, wherein the instructions, when executed, cause the computing system to:
   perform validation for originality;
   decompress the persistent translation cache when the persistent translation cache is compressed;
   decrypt the persistent translation cache when the persistent translation cache is compressed;
   re-position the persistent translation cache to a pre-defined address; and
   initiate a translation cache data invalidation process to clear the persistent-invalid translation cache data.

17. An apparatus to process translation cache data, comprising:
   a grouping organizer to group translation cache data together to form a translation cache closure;
   a persistency buffer to store the translation cache closure in a snapshot consistent state that is to be saved to persistent memory as a saved persistent translation cache, wherein the snapshot consistent state includes all stored allocated memory blocks in a memory pool, and wherein cache data not in the translation cache closure is to be filtered out of persistent translation cache, flagged as persistent-invalid, and invalidated during recovery of the translation cache data; and
   a recouper to recover the translation cache data after reloading the persistent translation cache to a memory area.

18. The apparatus of claim 17, wherein the grouping organizer is to:
   allocate the translation cache data from a same or different fixed-mapped continuous memory area as the first fixed-mapped continuous memory area; and
   allocate the translation cache data from the memory pool, wherein the memory pool facilitates persistent translation cache storage and recovery.

19. The apparatus of claim 17, wherein the grouping organizer is to:
   group non-translation cache data into a second fixed-mapped continuous memory area; and
   group together both first and second fixed-mapped continuous memory areas to form the translation cache closure from the translation cache data and the non-translation cache data.

20. The apparatus of claim 17, wherein the persistency buffer is to one or more of:
   allocate all translation cache data from the first fixed-mapped continuous memory save all translation cache data as a whole and overwrite an old snapshot consistent state as a new state is generated; or
   allocate all translation cache data from multiple first fixed-mapped continuous memory areas save active translations of the multiple first fixed-mapped continuous memory areas with a serial number allocated for each translation and load the active translations to corresponding positions in the multiple first fixed-mapped continuous memory areas when recovered.

21. The apparatus of claim 17, wherein the recouper is to:
   recover the persistent translation cache upon reloading into the first fixed-mapped continuous memory area;
   perform validation for originality;
   decompress the persistent translation cache when the persistent translation cache is compressed;
   decrypt the persistent translation cache when the persistent translation cache is encrypted;
   re-position the persistent translation cache to a pre-defined address; and
   initiate a translation cache data invalidation process to clear the persistent-invalid translation cache data.

* * * * *

UNITED STATES PATENT AND TRADEMARK OFFICE
CERTIFICATE OF CORRECTION

PATENT NO. : 9,767,024 B2  
APPLICATION NO. : 14/780428  
DATED : September 19, 2017  
INVENTOR(S) : Wu et al.

Page 1 of 2

It is certified that error appears in the above-identified patent and that said Letters Patent is hereby corrected as shown below:

In the Claims

At Column 11, Claim number 5, Line number 42, after "memory", insert --,--

At Column 11, Claim number 5, Line number 43, after "whole", insert --,--

At Column 11, Claim number 5, Line number 46, after "areas", insert --,--

At Column 11, Claim number 5, Line number 49, after "translation", insert --,--

At Column 12, Claim number 7, Line number 2, after "state", delete "a"

At Column 12, Claim number 10, Line number 30, after "memory", insert --,--

At Column 12, Claim number 10, Line number 31, after "whole", insert --,--

At Column 12, Claim number 10, Line number 34, after "areas", insert --,--

At Column 12, Claim number 10, Line number 37, after "translation", insert --,--

At Column 13, Claim number 14, Line number 16, delete "area ;" and insert --area;--

At Column 13, Claim number 15, Line number 25, after "memory", insert --,--

At Column 13, Claim number 15, Line number 26, after "whole", insert --,--

At Column 13, Claim number 15, Line number 27, before "is", delete "are"

At Column 13, Claim number 15, Line number 29, after "areas", insert --,--

Signed and Sealed this  
Tenth Day of July, 2018

Andrei Iancu  
*Director of the United States Patent and Trademark Office*

CERTIFICATE OF CORRECTION (continued)
U.S. Pat. No. 9,767,024 B2

At Column 13, Claim number 15, Line number 32, after "translation", insert --,--

At Column 14, Claim number 20, Line number 30, after "memory", insert --,--

At Column 14, Claim number 20, Line number 31, after "whole", insert --,--

At Column 14, Claim number 20, Line number 34, after "areas", insert --,--

At Column 14, Claim number 20, Line number 37, after "translation", insert --,--